J. C. Gross,
Subsoil Plow.
No. 94,307.   Patented Aug. 31, 1869.
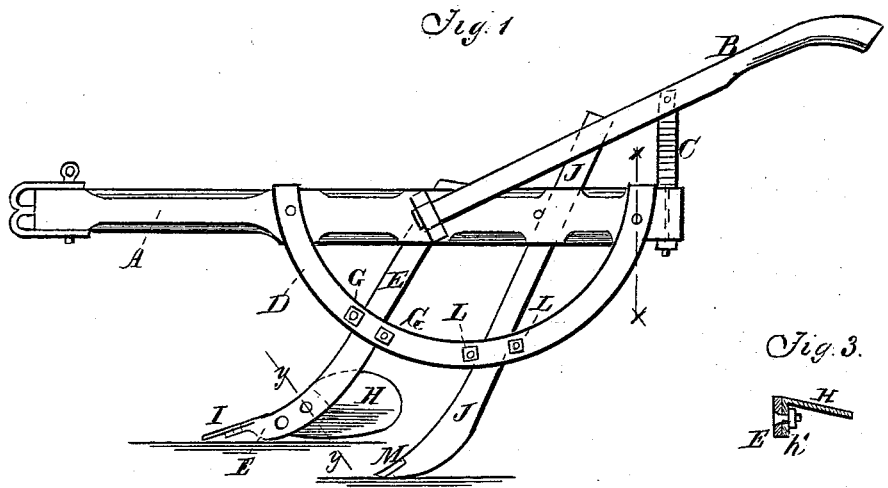
Fig. 1
Fig. 3
Fig. 2
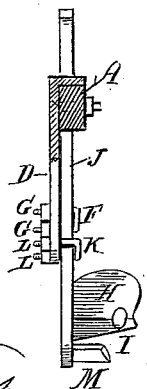
Witnesses:
Geo. W. Maher
Thos. F. Brooks
Inventor:
J. C. Gross
per   Munn
Attorneys.

United States Patent Office.

J. C. GROSS, OF GOSHEN HILL, SOUTH CAROLINA.

IMPROVEMENT IN COMBINED TURN AND SUBSOIL PLOW.

Specification forming part of Letters Patent No. 94,307, dated August 31, 1869.

*To all whom it may concern:*

Be it known that I, J. C. GROSS, of Goshen Hill, in the county of Union and State of South Carolina, have invented a new and useful Improvement in Combined Turn and Subsoil Plows; and I do hereby declare that the following is a full, clear, and exact description thereof, which will enable others skilled in the art to make and use the same, reference being had to the accompanying drawings, forming part of this specification, in which—

Figure 1 is a side view of my improved plow. Fig. 2 is a detail sectional view of the same, taken through the line $xx$, Fig. 1. Fig. 3 is a detail sectional view of the same, taken through the line $yy$, Fig. 1.

Similar letters of reference indicate corresponding parts.

My invention has for its object to improve the construction of the plow for which Letters Patent No. 27,626 were issued March 27, 1860, which Letters Patent were assigned to me May 1, 1868, so as to make it simpler in construction, stronger, and more readily and conveniently adjusted for the various purposes to which it may be applied; and it consists in the construction and combination of a semicircular bar and clamping device with the standards and beams of the plow, as hereinafter more fully described.

A is the beam of the plow.

B are the handles, the forward ends of which are secured to the sides of beam A by keepers or sockets attached to the said beam. The upper parts of the handles are connected to each other by a round or cross bar, and are connected with the rear end of the beam A by the brace-bars C.

D is a curved or semicircular bar, the ends of which are turned over at right angles or flanged to overlap the upper side of the beam A. The rear end of the semicircular bar D is securely bolted to the side of the rear end of the beam A, and its forward end is securely bolted to the side of the middle part of said beam.

E is the standard of the turn-plow, the upper end of which passes up through a hole or slot in the beam A. The standard E is secured to the curved or semicircular bar D by the staple F, the arms of which pass through holes in the said bar D, and have screw-threads cut upon them to receive the nuts G, so that by screwing up the said nuts G the standard E may be securely clamped to the bar D.

It has been found that the standards of the plow upon which this present invention is designed as an improvement are liable to be bent or broken on account of the perforations made therein to allow them to be adjusted vertically upon the semicircular bar. The provision of clamps of the kind described not only entirely obviates the difficulty referred to, but even strengthens the standards at the point of attachment, besides furnishing a convenient means of adjusting the same vertically. This construction enables the said standard to be conveniently and quickly adjusted by simply loosening the nuts G.

H is the mold-board, which is formed with an inwardly-projecting flange, $h'$, along its colter, by means of which it may be securely and detachably bolted to the lower part or foot of the standard E. This construction allows the mold-board to be readily detached and replaced by one of a different size, when required, according to the purpose for which the plow is to be used.

I is the plow-point, which is bolted to the forward end or foot of the standard E, and which rests upon a shoulder or lug formed upon the lower or forward edge of the mold-board H, so that the said point may be conveniently removed and replaced with a new one when desired.

J is the standard of the subsoil-plow, which passes up through a slot in the rear part of the beam A, and is detachably secured to the semicircular bar D by the staple K and screw-nuts L, in the same manner as hereinbefore described with reference to the standard E.

M is the subsoil-plow, which is securely attached to the lower end of the standard J.

Having thus described my invention, what I claim as new, and desire to secure by Letters Patent, is—

The combination of the curved or semicircular bar D, staples F, and screw-nuts G with the standards E J and beam A of the plow, as herein shown and described, for the purpose specified.

J. C. GROSS.

Witnesses:
 J. C. HUNTER,
 J. E. AUGHTRY.